Jan. 2, 1951
A. L. MURRAY
2,536,388
LIGHTWEIGHT SECTIONAL FISHING POLE
Filed April 26, 1944
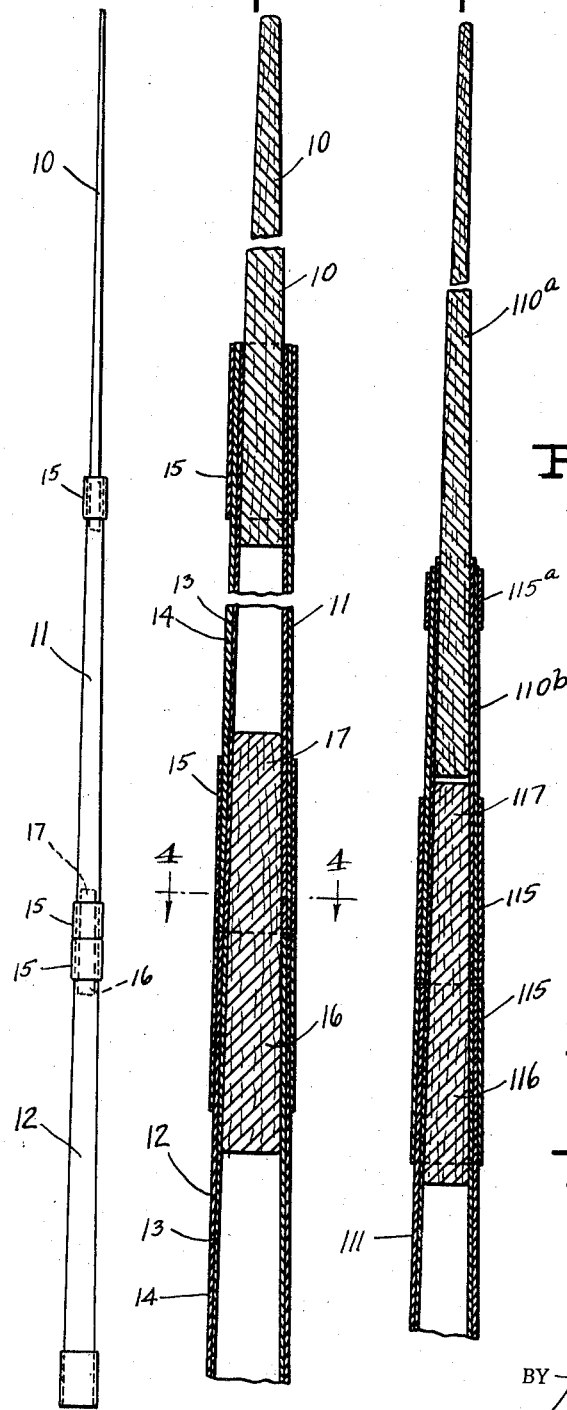
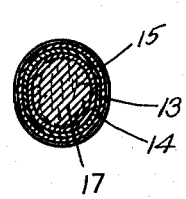
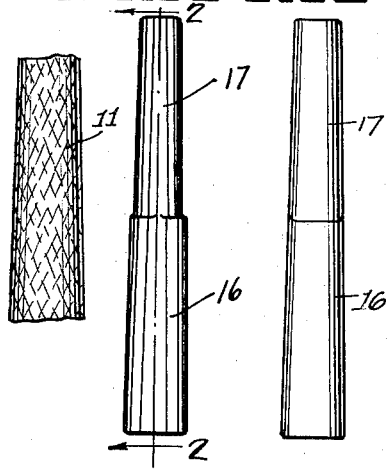
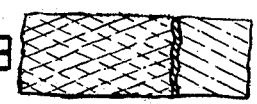
INVENTOR.
ALBERT L. MURRAY
BY Lockwood, Goldsmith, Galt.
ATTORNEYS.

Patented Jan. 2, 1951

2,536,388

UNITED STATES PATENT OFFICE 2,536,388

LIGHTWEIGHT SECTIONAL FISHING POLE

Albert L. Murray, Auburn, Ind.

Application April 26, 1944, Serial No. 532,751

2 Claims. (Cl. 43—18)

This invention relates to a light weight sectional pole having the advantages of a cane pole and a multi-section pole.

The chief object of the invention is to provide a pole having the foregoing characteristics and from non-metallic material such as wood and arranged in such a manner that the resulting pole is stronger than a conventional cane pole.

One chief feature of the invention resides in the formation of certain or all of the pole sections of a plurality of plies of wood veneer, the grain direction of adjacent plies being biased relatively and about 45° of each other, the general direction of the grain being longitudinally of the pole axis.

Another chief feature of the invention, when the same is embodied in sectional forms, resides in the elliptical-circular plug and socket connection between adjacent ends of adjacent sections.

Other objects and features of the invention will be pointed out more fully hereinafter.

The full nature of the invention will be understood from the accompanying drawings and the following description and claims.

In the drawings Fig. 1 is an elevational view of one embodiment of the invention illustrating three successively connected sections thereof.

Fig. 2 is a longitudinal central sectional view of the successively connected sections, parts of each being broken away, one section being telescopically nestable in the other and taken in the plane of line 2—2 of Fig. 5 and in the direction of the arrows.

Fig. 3 is a similar view of a modified form of the invention and of the two end sections.

Fig. 4 is a transverse sectional view taken on line 4—4 of Fig. 2 and in the direction of the arrows, but turned 90° so that the major axis of the elliptical-like portion is vertical in Fig. 4.

Fig. 5 is an elevational view of a plug connector.

Fig. 6 is a top plan view thereof.

Fig. 7 is an elevational view of a pole portion showing the grain and biasing thereof.

Fig. 8 is a view similar to Fig. 5 but at right angles thereto.

Fig. 9 is a plan view of a developed or flat form of the invention with a portion of one ply broken away, the grains of the two illustrated plies being shown in relative relation.

In Figs. 1 and 2 of the drawing, 10 indicates a tip section, 11 an adjacent section and 12 a successive section of a multi-section fishing pole. All sections may be tubular or as herein disclosed, the tip section is solid as shown in Fig. 2.

The other sections, and the tip section if tubular, are each comprised of at least two plies 13 and 14 of wood veneer, which are resin or plastic secured together, and said plies preferably have their grain directions biased to each other, as for example, approximately 45° and having a general direction broadly corresponding to the longitudinal axis of the section. Each section is suitably tapered. Each section at each end may be suitably reenforced by a veneer band 15, similarly secured to the section.

Each tubular section accordingly is substantially as light in weight as a cane pole piece of the same length and diameter and may even be of less weight. It, however, is much stronger than a cane pole piece of that size. Each section is slightly resilient.

One method of connecting sections comprises rigidly securing by suitable means, such as the veneer resin or plastic adhesive, a plug 16 in one end of one tubular section. The plug 16 is circular in transverse cross-section and is tapered as seen in Fig. 5. An elliptical-like portion 17 is integral with plug 16 and projects beyond the end of the plug supporting section. The plug 16 and projection 17 if desired may be formed of compacted rolled up veneer as a solid mass or may be a solid piece as illustrated. The junction between portions 16 and 17 comprises crescent shaped segments which are coplaner and transverse to the longitudinal axis of the plug.

When the sections are to be connected together, the plug end of one section is presented to the adjacent end of the adjacent section. This is squeezed by finger and thumb pressure until it assumes elliptical-like form to readily receive the elliptical-like projection 17 which is then fully seated until adjacent bands 15 contact. When the pressure is released, the projection enveloping section end tends to reassume circular sectional form with the result that this portion firmly grips the projection 17 to retain the sections together.

Thus the connection between sections also serves to interiorly reenforce each section at the end.

In Fig. 2 end section 10 is illustrated as being telescopically associated with section 11. It is presented thereto at the larger end and allowed to drop by gravity through section 11 until it projects beyond the section. It is then grasped and pulled out as far as possible. The internal taper of section 11 limits extension of tip 10 and serves to rigidly and frictionally grip these two sections together.

If desired, each plug 16 may be similarly rigidly secured to its supporting section instead of being adhesively connected thereto as previously described.

The structures illustrated in Figs. 1 and 2, for example, may be assembled in a compact structure by detaching section 11 from projection 17. The tip 10 can be then nested in the section 11 and the two sections 10 and 11, as a unit, nested within the section 12 by inserting the smaller end of section 11 into the larger end of section 12.

In Fig. 3 a modified form of the invention is illustrated. Herein the tip section is partially solid, that is the tip is solid as at 110a and rigid therewith is tubular portion 110b similar to the next larger tubular section such as indicated at 111. Thereabout at the open end is band 115 to reenforce same. The opposite end is reenforced by band 115a.

Plug 116 carried by section 111 has projection 117 for seating in the socket end of section 110b as previously described. The plug end is also band reenforced at 115 as before. This illustrated a modified form of connection between the tip section and next adjacent section, and a second form of tip section structure. Note in Figs. 1 and 2 the tip section 10 is not of socket including type whereas in Fig. 3 the tip section 110a—110b is of socket including type.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the scope of the invention, reference being had to the appended claims.

The invention claimed is:

1. A sectional fishing pole comprising a plurality of tubular sections, each composed of a plurality of plies of wood veneer rigidly united together with the grains of adjacent plies biased relative to each other, each ply being tubularly arranged, and the general direction of the grains being in the direction of the longitudinal axis of the section, and a projection and projection receiving socket connection between the adjacent ends of adjacent sections, the adjacent sections being progressively tapered, the projection and socket connection being of plug and ferrule type, the plug thereof being carried by one section and having an elliptical-like transverse sectioned projection receivable by the ferrule type socket end of the adjacent section, the socket portion of the connection being initially and normally circular in transverse section and being compressible into conforming elliptical-like shape for facilitating projection seating and tending to return to original circular sectional outline for projection gripping when released from compression.

2. A pair of detachably connected fishing pole, tubular sections, one supporting the other adjacent the confronting ends of the same, and a plug and ferrule connection therebetween comprising a plug portion rigid with and within one confronting end of one and the supporting section, and having an elliptical-like sectioned projection extending beyond the end of the supporting section, the other section adjacent its confronting end having an initially cylindrical socket therein of ferrule type and compressible into elliptical-like form for facilitating elliptical-like projection reception and seating, and gripping of the projection when released from elliptical-like shape forming constraint.

ALBERT L. MURRAY.

REFERENCES CITED

The following references are of record in the file of this patent:

UNITED STATES PATENTS

| Number | Name | Date |
|---|---|---|
| 373,561 | Kirker | Nov. 22, 1887 |
| 395,931 | Treadway | Jan. 8, 1889 |
| 692,884 | Lyon | Feb. 11, 1902 |
| 734,870 | Hoglund | July 28, 1903 |
| 1,355,778 | Prior et al. | Oct. 12, 1920 |
| 1,625,510 | Tredwell | Apr. 19, 1927 |
| 1,723,400 | Bolger | Aug. 6, 1929 |
| 1,961,642 | Pirnie | June 5, 1934 |
| 2,296,781 | Farney | Sept. 22, 1942 |
| 2,347,534 | Anderson | Apr. 25, 1944 |
| 2,353,662 | Goldman | July 18, 1944 |

FOREIGN PATENTS

| Number | Country | Date |
|---|---|---|
| 18,575 | Great Britain | Dec. 12, 1912 |
| 677,719 | France | Dec. 18, 1929 |